United States Patent
Rauch

(10) Patent No.: US 11,698,226 B2
(45) Date of Patent: Jul. 11, 2023

(54) EXPANSION CONSTRAINT ASSEMBLY AND RELATED METHODS

(71) Applicant: NOVELIS INC., Atlanta, GA (US)

(72) Inventor: Edwin L. Rauch, Fulton, NY (US)

(73) Assignee: Novelis Inc., Atlanta, GA (US)

( * ) Notice: Subject to any disclaimer, the term of this patent is extended or adjusted under 35 U.S.C. 154(b) by 356 days.

(21) Appl. No.: 16/749,428

(22) Filed: Jan. 22, 2020

(65) Prior Publication Data
US 2020/0240710 A1  Jul. 30, 2020

Related U.S. Application Data

(60) Provisional application No. 62/798,058, filed on Jan. 29, 2019.

(51) Int. Cl.
*F27B 7/22* (2006.01)
*F27D 1/00* (2006.01)
(Continued)

(52) U.S. Cl.
CPC .............. *F27B 7/22* (2013.01); *F27D 1/0003* (2013.01); *C04B 7/44* (2013.01); *F27B 7/02* (2013.01);
(Continued)

(58) Field of Classification Search
CPC ...... C04B 7/44; F27B 7/02; F27B 7/22; F27B 2007/027; F27B 2007/2293; F27D 1/0003; F27D 2001/0083; F27D 2001/0096
(Continued)

(56) References Cited

U.S. PATENT DOCUMENTS 2,877,007 A * 3/1959 Risse .................... F27B 7/2206
432/103
3,918,893 A * 11/1975 Whitaker .............. F27B 7/2206
432/103
(Continued)

FOREIGN PATENT DOCUMENTS

CN      204787768 U    11/2015
CN      108007187       5/2018
(Continued)

OTHER PUBLICATIONS

International Application No. PCT/US2020/014576, International Search Report and Written Opinion, dated Apr. 20, 2020, 15 pages.
(Continued)

*Primary Examiner* — Steven B McAllister
*Assistant Examiner* — Benjamin W Johnson
(74) *Attorney, Agent, or Firm* — Kilpatrick Townsend & Stockton LLP

(57) ABSTRACT

An expansion constraint assembly can be attached to the exterior of a kiln cylinder. The expansion constraint assembly may include an outer constraining structure, an inner circular structure, and support structures extending between the inner circular structure and the outer constraining structure. The support structures may extend at an offset angle away from a radial direction of the outer constraining structure. The expansion constraint assembly may also include additional rings disposed between the inner circular structure and the outer constraining structure. The expansion constraint assembly can constrain asymmetric expansion of the kiln cylinder, for example, by relieving uniform expansion as a rotational shift, while restraining asymmetric expansion via tensile and compressive stresses in interconnecting members.

17 Claims, 4 Drawing Sheets

(51) Int. Cl.
 *C04B 7/44* (2006.01)
 *F27B 7/02* (2006.01)
(52) U.S. Cl.
 CPC . *F27B 2007/027* (2013.01); *F27B 2007/2293* (2013.01); *F27D 2001/0083* (2013.01); *F27D 2001/0096* (2013.01)
(58) Field of Classification Search
 USPC .......................................................... 432/103
 See application file for complete search history.

(56) References Cited

U.S. PATENT DOCUMENTS

| | | | |
|---|---|---|---|
| 4,087,334 A | | 5/1978 | Harig et al. |
| 4,953,480 A | * | 9/1990 | Collins, Jr. ............... F23G 5/20 432/103 |
| 5,549,058 A | * | 8/1996 | Tutt ..................... C04B 7/4438 110/109 |

FOREIGN PATENT DOCUMENTS

| | | |
|---|---|---|
| CN | 207515503 U | 6/2018 |
| JP | 2002039683 A | 2/2002 |
| WO | 2014194567 | 12/2014 |

OTHER PUBLICATIONS

CA3,125,990 , "Office Action", dated Oct. 12, 2022, 3 pages.
CN202080011204.9 , "Office Action", dated Sep. 1, 2022, 17 pages.
EP20711006.5 , "Notice of Decision to Grant", dated Oct. 27, 2022, 2 pages.
KR10-2021-7022932 , "Office Action", dated Oct. 13, 2022, 9 pages.

* cited by examiner

EXPANSION CONSTRAINT ASSEMBLY AND RELATED METHODS

CROSS-REFERENCE TO RELATED APPLICATION

This application claims the benefit of and priority to U.S. Provisional Application No. 62/798,058, filed on Jan. 29, 2019, and titled "EXPANSION CONSTRAINT ASSEMBLY AND RELATED METHODS," the content of which is herein incorporated by reference in its entirety for all purposes.

FIELD

The present disclosure relates to industrial processing equipment, such as rotary kilns and rotary furnaces, and more specifically to systems and methods for reinforcing such rotary kilns and rotary furnaces.

BACKGROUND

Rotary kilns and rotary furnaces can be utilized in a variety of contexts for processing metal and/or other material. In one typical example, scrap metal is deposited into one end of the kiln, where it is heated to remove foreign material from the surface of the metal. The resulting clean metal is then routed out of the opposite end of the kiln for further processing.

In many scenarios, a kiln or furnace includes a rotating process cylinder, hereafter referred to as a 'kiln cylinder.' The kiln cylinder is susceptible to asymmetric expansion due to the localized heating of the cylinder. This expansion can cause the kiln cylinder to go out-of-round and inhibit the cylinder from rotating properly. Traditionally, a reinforcing ring is attached to the exterior of the cylinder in order to prevent such asymmetric expansion. Such a ring will typically exchange heat with the local environment, and thus will be subject to a different temperature (and thus potentially a different amount of thermal expansion) than the cylinder that the ring is intended to restrain. However, if the ring is designed and/or sized to precisely fit the cylinder before heating occurs, the resulting expansion can break the ring, causing damage to the cylinder and requiring that the ring be replaced. Conversely, if the ring is designed and/or sized to fit the kiln cylinder after the expected heating occurs, it will be either loose or overly tight when the kiln is operated at a temperature outside the design point. A loose ring will tend to rest on the kiln cylinder and can wear a channel into the kiln cylinder, which can necessitate the kiln cylinder needing to be repaired or replaced. An overly tight ring can cause unplanned deformation or breakage of the ring or the kiln cylinder.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

Certain examples herein address systems and methods for reinforcing rotary kilns and rotary furnaces (all hereafter referred to as rotary kilns) used in industrial processing equipment for processing industrial material, such as metal or other material. Industrial processing equipment herein after may refer to any equipment used to process industrial material, such as metal, that is used in or developed for use in industry. Various examples utilize a self-relieving stiffener ring assembly (which may be an example of an expansion constraint assembly discussed further herein) that can be implemented in a rotary kiln system that may also include a kiln cylinder and a heat source. The heat source or thermal reactions within the industrial material being processed may cause the kiln cylinder to heat unevenly, causing a disposition toward asymmetric expansion that can then cause the kiln cylinder to go out-of-round if unchecked. The arrangement and subcomponents of the stiffener ring assembly on the exterior of the kiln cylinder, however, may help inhibit the kiln cylinder from expanding asymmetrically, for example, constraining the kiln cylinder toward symmetric expansion instead.

For example, the stiffener ring assembly can include an outer ring (which may be an example of an outer constraining structured), an inner ring (which may be an example of a ring discussed further herein) and support structures that span between the inner ring and the outer ring at an orientation angled away from a radial direction of the kiln cylinder (which may be an example of an offset angle discussed further herein). The inner ring can be attached intimately to the exterior of the kiln cylinder such that the ring is isothermal with the kiln cylinder causing the kiln cylinder and the inner ring to expand proportionally. Isothermal herein may refer to equality of temperature or constant temperature. Normal uniform heating of the kiln cylinder and the inner ring will result in the inner ring expanding relative to the outer ring. Any localized differential heating and/or expansion of the inner ring can put the support structures between the inner and outer rings in substantial compressive or tensile stress in response and transfer the forces from the kiln cylinder to the outer ring. Transfer of forces from the kiln cylinder to the outer ring may cause the outer ring to rotate, relieving much or most of the resultant thermally induced stress. Rotation of the outer ring can absorb normal uniform thermal expansion at very low stress levels, but maintain high compressive and tensile stresses in the connecting support structures to resist localized radial expansion or contraction and resist asymmetric expansion of the kiln cylinder.

In various examples, a rotary kiln system is provided. The system can include: a rotator; a heating system; and a kiln cylinder rotatable by the rotator. The kiln cylinder may be in communication with the heating system to provide heat into the kiln cylinder. The kiln cylinder may include: a central axis; an exterior kiln cylinder surface; and a collar. The collar can be axially aligned with the central axis and receive at least one portion of the kiln cylinder. The kiln cylinder may also include a cross-sectional thickness that can be urged toward variable expansion in a radial direction of the kiln cylinder and responsive to a variable thermal profile resulting from heat within the kiln cylinder provided by the heating system and/or thermal actions or reactions of the industrial material being processed. The rotary kiln system can further include an expansion constraint assembly axially aligned with the central axis and anchored to the exterior kiln cylinder surface. The expansion constraint assembly may limit the variable expansion of the cross-sectional thickness of the kiln cylinder. The expansion constraint assembly may include an outer constraining structure and a plurality of support structures. Each support structure can extend between an interior of the outer constraining structure and the exterior kiln cylinder surface. Each support structure can also be arranged at an offset angle away from the radial direction of the outer constraining structure. Each support structure further can be anchored to the exterior kiln cylinder surface and the outer constraining structure.

In various examples, an expansion constraining assembly for a kiln structure is provided. The assembly can include an outer constraining structure, an inner circular structure, and support structures. The inner circular structure can be disposed radially inward from the outer constraining structure and within the expansion constraining assembly. The support ring assembly may further include a plurality of support structures, arranged at an offset angle away from a radial direction of the outer constraining structure. The plurality of braces may also extend between the outer constraining structure and the inner circular structure. The plurality of support structures further may be attached to the outer constraining structure and the inner circular structure.

In various examples, an expansion constraining method for industrial processing equipment is provided. The method can include receiving an outer constraining structure and a plurality of support structures aligned on an outer surface of an inner circular structure. The outer constraining structure can be positioned around the outside of the inner circular structure. The method further can include resisting non-uniform expansion of the inner circular structure by at least causing an increase in a tension or compression of at least one of the plurality of support structures or rotation of the outer constraining structure around a central axis of the inner circular structure.

Other objects and advantages will be apparent from the following detailed description of non-limiting examples.

BRIEF DESCRIPTION OF THE FIGURES

The specification makes reference to the following appended figures, in which use of like reference numerals in different figures is intended to illustrate like or analogous components.

DETAILED DESCRIPTION

As used herein, the terms "invention," "the invention," "this invention," and "the present invention" are intended to refer broadly to all of the subject matter of this patent application and the claims below. Statements containing these terms should be understood not to limit the subject matter described herein or to limit the meaning or scope of the patent claims below. The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. As used herein, the meaning of "a," "an," and "the" includes singular and plural references unless the context clearly dictates otherwise.

Figure 1:
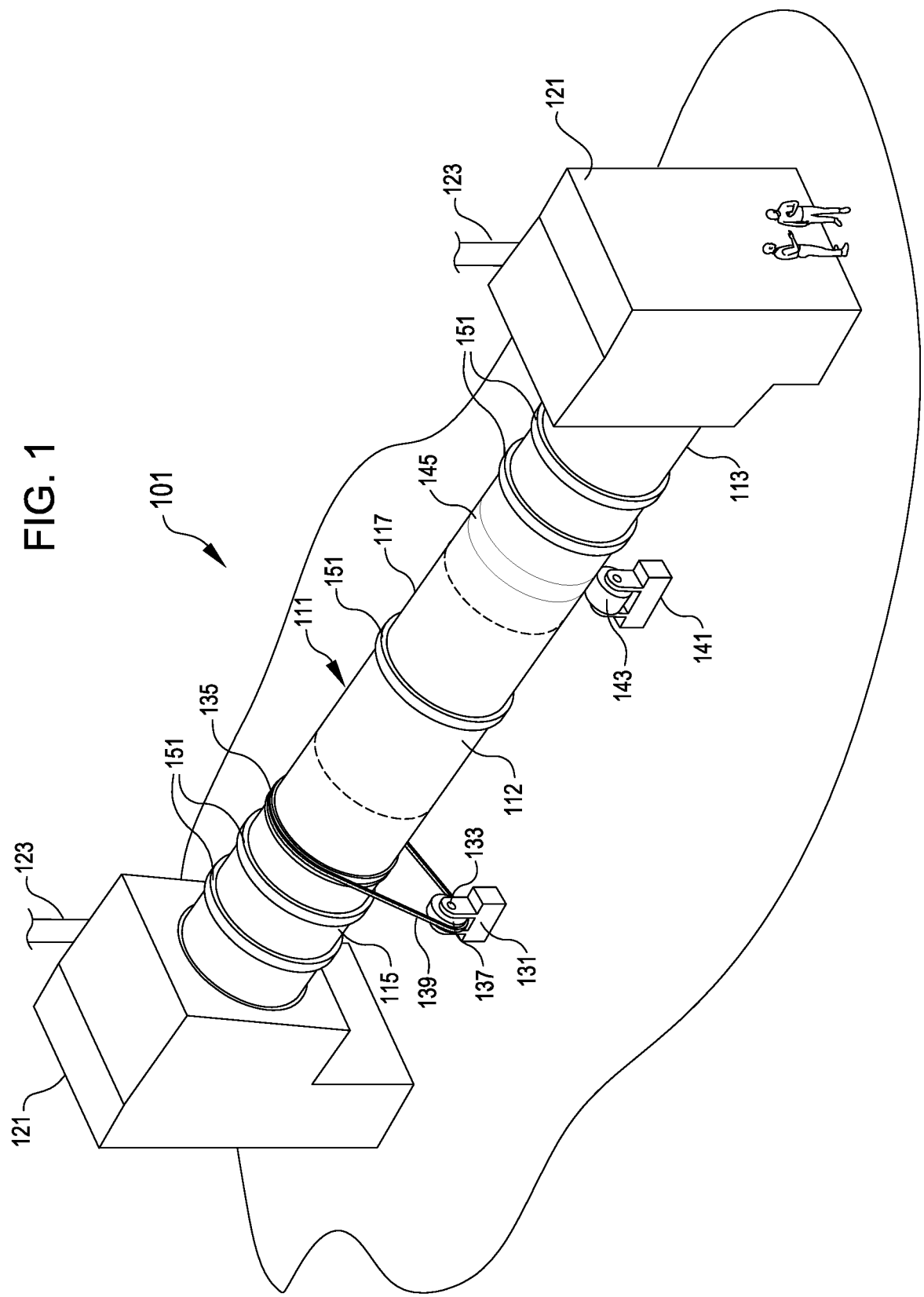
FIG. 1 is a perspective view of a rotary kiln system with expansion constraint assemblies according to various embodiments.

FIG. 1 depicts a material processing system 101 with industrial processing equipment for processing industrial material. Industrial processing equipment herein may refer to any equipment used to process industrial material, such as metal, that is used in or developed for use in industry. The material processing system 101 as depicted in FIG. 1 includes a kiln cylinder 111, a collar 121, a rotator 131, a rotational support 141, and an expansion constraint assembly 151; however, the material processing system 101 can include any number and variety of elements.

Figure 3:
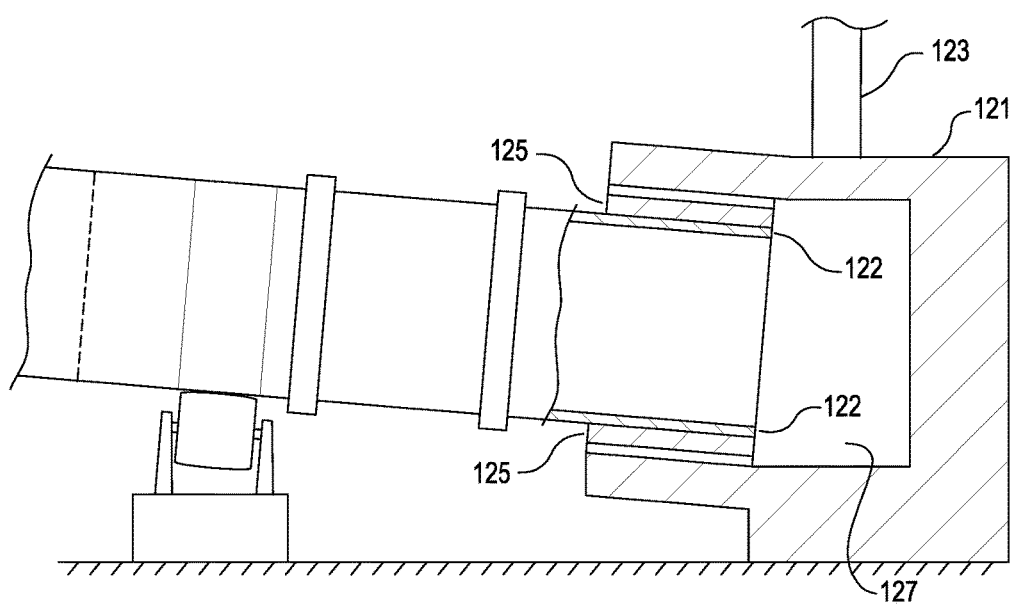
FIG. 3 is a cross-sectional side view of a portion of the rotary kiln system of FIG. 2 with leaves engaging the kiln cylinder and collar according to various embodiments.

The kiln cylinder 111 in FIG. 1 is depicted as having a circular shape defined by a wall 122 (shown in FIG. 3). The wall 122 can be capable of withstanding the high temperatures that may be achieved when processing different types of industrial material. The wall may include but is not limited to, various ores, cement, aluminum, steel, titanium, or other pure or alloyed metals. For example, the wall 122 may include suitable refractory material. The wall 122 may partially define an exterior kiln cylinder surface 112. The wall 122 and/or the exterior kiln cylinder surface 112 may correspond to or include a casing comprising aluminum, iron, titanium, or any material suitable for attaching to the refractory material.

The term "refractory material" as used herein may include any materials that are relatively resistant to attack by molten metals and/or that are capable of retaining their strength at the high temperatures contemplated for the material in use. Such materials may include, but are not limited to, ceramic materials (inorganic non-metallic solids and heat-resistant glasses) and non-metals. A non-limiting list of suitable materials includes the following: the oxides of aluminum (alumina), silicon (silica, particularly fused silica), magnesium (magnesia), calcium (lime), zirconium (zirconia), boron (boron oxide); metal carbides, borides, nitrides, silicides, such as silicon carbide, particularly nitride-bonded silicon carbide (SiC/Si3N4), boron carbide, boron nitride;

aluminosilicates, e.g. calcium aluminum silicate; composite materials (e.g. composites of oxides and non-oxides); glasses, including machinable glasses; other material; wools of fibers or mixtures thereof; carbon or graphite; and the like. As an illustrative example, in some contexts, refractory materials may withstand temperatures up to 1200° C. (e.g., which may be suitable for processing of aluminum or copper, though not likely steel, which tends to be processed at higher temperatures for which other suitable refractory material may nevertheless be available), although in some other contexts, refractory material suitable for processing aluminum and its alloys may be selected to withstand working temperatures in the lower range of 400 to 800° C.

The kiln cylinder 111 may correspond to or include a tube or any other structure that is a suitable shape for rotation. The kiln cylinder 111 may have a first portion 113, a second portion 115, and a middle portion 117 spanning between the first portion 113 and the second portion 115. The portions may correspond to shorter cylinders connected to form the kiln cylinder 111 and may be designated by lines on the outside of the kiln cylinder 111, or may have no formal designation. The first portion 113 can correspond to the material discharge end of the kiln cylinder 111, and the second portion 115 can correspond to the material feed end of the kiln cylinder 111. Heating medium can be applied to the kiln cylinder in a co-current direction or counter-current direction with respect to the material flow. The kiln cylinder 111 can be defined by certain dimensions such as a length, a circumference, and a radius. The kiln cylinder 111 may have any suitable length, such as between 10 and 200 meters, any suitable circumference, such as between 3 and 20 meters, and any suitable diameter, such as between 1 and 10 meters, although other different dimensions individually or in combination additionally or alternatively may be suitable.

The kiln cylinder 111 can also have at least one opening suitable for accepting metal into the interior of the kiln. The collar 121 may be used to cover part or all of the openings in the kiln cylinder 111. The collar 121 may correspond to or include a housing structure. The collar 121 may be located at a location along the length of the kiln cylinder 111, including at the end of the kiln cylinder 111. Alternatively, the location of the collar 121 may or may not correspond to an opening in the kiln cylinder 111. The collar can be, for example, an end structure located at the end of the kiln cylinder 111 with a round opening that matches the round shape of the kiln cylinder 111.

Further, the material processing system 101 may include a single collar 121 or multiple collars. For example, the material processing system 101 may have a kiln cylinder 111 with a collar 121 on both ends as depicted by way of example in FIG. 1.

The kiln cylinder 111 may be supplied with heat by any suitable heating system or combination of systems, including, but not limited to, a gas-fed burner (not pictured). As depicted by way of example in FIG. 1, the heat (or fuel, air, and/or other elements for generating and/or conveying the heat) may be fed into the kiln cylinder 111 via a conduit 123 for supply (e.g., attached to the collar 121), while exhaust may be discharged through a conduit 123 for removal (e.g., in another collar 121, such as at an opposite end of the kiln cylinder 111). Alternatively, supply and removal may be routed through a single conduit 123 (e.g., via a tube subdivided into separate conduits or a tube that may be cycled to switch between supply and removal modes). Any number of conduits 123 for supply and/or removal may be utilized (e.g., including supplying via a plurality of conduits and/or discharging exhaust through a separate plurality of conduits), and may be located in a single collar 121 or any number of collars 121.

The heating system can heat the interior of the kiln cylinder 111 to a suitable temperature for industrial material processing. For example, in a recycling context, the interior of the kiln cylinder 111 may be heated sufficiently to cause paint or other coatings to be burned off and removed from metal to facilitate subsequent processing. Exothermic or endothermic reactions involved with paint removal and/or other chemical reactions can add to or reduce the heating in unpredictable and sometimes localized ways. The heating may cause the kiln cylinder 111 to have an uneven heat profile. For example, the kiln cylinder 111 may also include a cross-sectional thickness 422 (FIG. 7) that can be urged toward variable expansion in a radial direction of the kiln cylinder 111 and responsive to a variable thermal profile resulting from rotation by the rotator 131 and heat provided within the kiln cylinder 111 by the heating system or thermal reactions within the kiln cylinder. Further, the uneven heat profile may cause localized areas of the first portion 113 (e.g., hot end) to be hotter than the bulk of the first portion 113, or localized areas or the bulk of the second portion 115 (e.g., cold end) and the middle portion 117. Alternatively, the heating system or thermal reactions within the kiln cylinder 111 may cause two portions of the kiln cylinder 111 to be hotter than a third portion, or two or more portions to be the same temperature.

The kiln cylinder 111 may be rotatable by a rotator 131. Rotating the kiln cylinder 111 may induce movement of the industrial material pieces being conveyed through the kiln cylinder 111, for example, to cause the industrial material pieces to tumble and expose more surface areas to heat within the kiln cylinder 111 and/or to cause the industrial material pieces to progress down the length of the kiln cylinder 111. The material processing system 101 can include a single rotator 131, as depicted in FIG. 1, or multiple rotators, for example, located at various points along the kiln cylinder 111.

The rotator 131 is depicted by way of example in FIG. 1 as including a motor 133, a cylinder gear 135, a motor gear 137, and a chain 139. However, the rotator 131 additionally or alternatively may include any other elements suitable to rotate the kiln cylinder 111. For example, the rotator 131 may use magnets to rotate the kiln cylinder 111. The motor 133 may be a gas engine, an electric engine, or any other suitable engine. The cylinder gear 135 can be affixed to the exterior kiln cylinder surface 112 and have any number of suitable teeth. Any type of gear could be used with a gear ratio that allows for the motor 133 to successfully rotate the kiln cylinder 111. The chain 139 can connect the motor gear 137 and the cylinder gear 135 to allow the motor 133 to spin the kiln cylinder 111 or the motor gear and cylinder gear can directly mesh with each other.

The rotation of the kiln cylinder 111 can be aided by the rotational support 141. The rotational support 141 can be a wheel, roller, or any other structure used to facilitate rotation of the kiln cylinder 111 by reducing the amount of resistance experienced by the kiln cylinder 111.

The rotational support 141 may include a bearing wheel 143 and a wheel support surface 145, as depicted in FIG. 1, or any other suitable structure. The bearing wheel 143 may rotate on a free bearing or may be driven to aid and/or replace the rotator 131 by providing rotational power. The bearing wheel, for example, may be a rubber wheel or a wheel which has had its surface covered with a friction-modifying substance to add or reduce tractive forces. The wheel support surface 145 may correspond to or include the exterior kiln cylinder surface 112 or may be attached to the exterior kiln cylinder surface 112.

The kiln cylinder 111 can expand in a radial direction in response to the increased internal temperature caused by the heating system or thermal reactions within the kiln cylinder. The heating system or thermal reactions within the kiln cylinder may cause the kiln cylinder 111 to heat unevenly, causing a disposition toward asymmetric expansion that can then cause the kiln cylinder 111 to go out-of-round if unchecked. For example, one part along a circumference of the kiln cylinder 111 may be relatively hotter and more prone to expansion than another part along the circumference of the kiln cylinder 111 that may be relatively cooler and more prone to lesser expansion or even contraction. The expansion constraint assembly 151, discussed in more detail below, can be placed on the exterior of the kiln cylinder 111 and attached to the exterior kiln cylinder surface 112 by any suitable means, for example, as depicted in FIG. 1. The expansion constraint assembly 151 may include, correspond to, or be replaced by a stiffener ring assembly or a constraining structure assembly, such as those described elsewhere herein.

The arrangement and subcomponents of the expansion constraint assembly 151 may help inhibit the kiln cylinder 111 from expanding asymmetrically, for example, constraining the kiln cylinder 111 toward symmetric expansion instead. In some examples, the expansion constraint assembly 151 may be placed inside the kiln cylinder 111 and attached to the interior surface instead of the exterior kiln cylinder surface 112.

The material processing system 101 can include a single expansion constraint assembly 151 or multiple expansion constraint assemblies 151. For example, as depicted in FIG. 1, the material processing system 101 could include five expansion constraint assemblies 151 located at various points along the exterior of the kiln cylinder 111. The multiple expansion constraint assemblies 151 may also be located inside the kiln cylinder 111, or a combination of interior or exterior expansion constraint assemblies 151 may be used. The multiple expansion constraint assemblies 151 may have the same internal construction or may differ in construction from one another. Various options for possible construction of the expansion constraint assembly 151 is discussed further below, in reference to FIG. 4.

The material processing system 101 may also include a feeding system (not pictured) that can transport untreated industrial material into the material processing system 101 and treated industrial material out of the material processing system 101. The feeding system may, for example, transport industrial material into one end of the kiln cylinder 111 and/or out of the other end of the kiln cylinder 111. The feeding system may further include a conveyance system to transport industrial material while it is inside of the kiln cylinder 111. The feeding system and/or conveyance system may include a series of moving or fixed plates or scoops, belts, rotating or fixed helical screw blades independent of or fixed to the inside of the kiln cylinder, magnets, or a combination of suitable transporting elements and can be used to transport industrial material all or part of the way through the material processing system 101.

Figure 2:
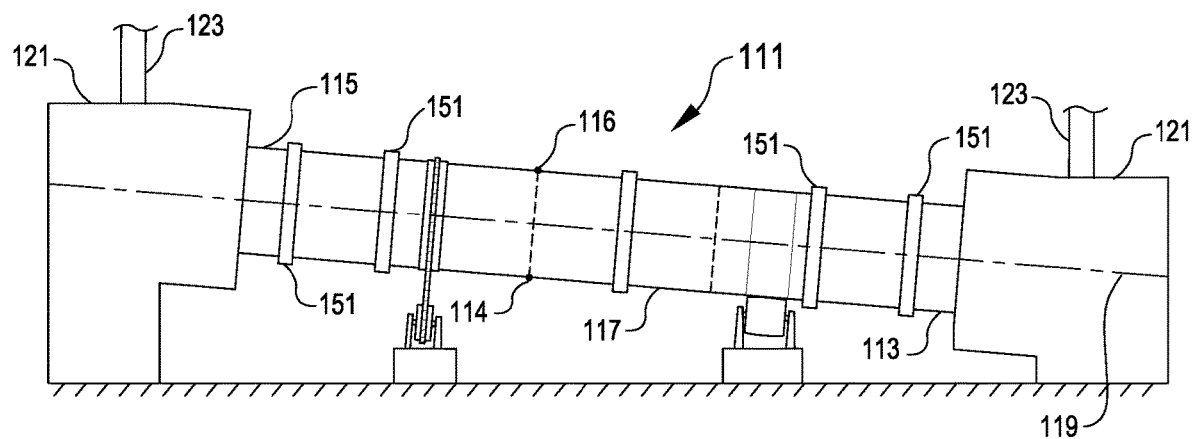
FIG. 2 is a side view of the rotary kiln system of FIG. 1 with the kiln axis tilted below horizontal according to various embodiments.

FIG. 2 depicts a side view of the material processing system 101. As shown in FIG. 2, the kiln cylinder 111 can have a central axis 119. The central axis 119 may be positioned through a center of the circular cross section of the kiln cylinder 111. The central axis 119 can be parallel to the ground, at an angle above horizontal, or at an angle below horizontal, as depicted in FIG. 2. The central axis 119 may be horizontal or angled above or below horizontal. The angle of the central axis 119 may be caused by one end of the kiln cylinder 111 being positioned higher than the other end of the kiln cylinder 111. For example, the kiln cylinder 111 may have two collars 121, one collar 121 at a first end of the kiln cylinder 111 and a second collar 121 at a second end of the kiln cylinder 111, with one collar 121 being at a higher vertical position than the other collar 121. Alternatively, the collars 121 may be at the same height, e.g., causing the central axis 119 to be horizontal. Positioning the central axis 119 at an angle below horizontal may facilitate movement of industrial material through the kiln cylinder 111. However, when the central axis 119 is horizontal or angled above horizontal, industrial material may also be moved through the kiln cylinder 111 using moving or fixed plates or scoops, belts, fixed or rotating helical screw blades independent of or fixed to the inside of the kiln cylinder, magnets, or any other appropriate conveyance means previously discussed.

The presence of industrial material being heated or cooled may cause localized heating or cooling where this industrial material is in contact with the kiln cylinder. If the industrial material being processed is in contact with the kiln cylinder at lower point 114 and is absorbing heat, and the industrial material is not in contact with upper point 116, the upper point 116 can then heat to a greater temperature than the lower point 114, which can cause the kiln cylinder 111 to be pre-disposed to expand more at the upper point 116 than at the lower point 114. The difference in expansion between the upper point 116 and the lower point 114 can lead to asymmetric expansion of the radial cross-section of the kiln cylinder 111 absent a suitable expansion constraint assembly 151.

The rotator 131 and the rotational support 141 of the material processing system 101 may be angled similarly to the kiln cylinder 111, angled opposite of the kiln cylinder 111, or at an angle that allows them to properly function with the kiln cylinder 111 that is positioned at an angle.

FIG. 3 depicts a cross-section of a portion of the material processing system 101. As shown in FIG. 3, the collar 121 can contain leaves 125 and an airlock 127. The leaves 125 can be engaged between the exterior kiln cylinder surface 112 and attached to the exterior or interior of the collar 121. The leaves 125 may function as a flexible seal about the exterior kiln cylinder surface 112. The leaves 125 may allow the kiln cylinder 111 to operate at a controllable oxygen atmosphere and reach a higher temperature than in the absence of the leaves, e.g., by sealing the end of the kiln cylinder 111 from the outside environment. The leaves 125 may be made of hardened steel, stainless steel, rubber, or any other material that is flexible while still allowing a seal to form between the exterior of the kiln cylinder 111 and the collar 121. The leaves may be equipped with a lubricated or self-lubricating element at the contact point with the kiln cylinder to extend the life of the leaves.

The collar 121 can also contain additional elements which may be used for sealing the kiln cylinder 111 from the outside environment. As depicted in FIG. 3, an airlock 127 or a similar mechanism may be incorporated and allow for industrial material to pass in and out of the end of the kiln cylinder 111 while still maintaining a seal in the kiln cylinder 111. The airlock 127 can comprise two sets of doors that alternately open and close in order to prevent ambient air from entering or hot air from escaping from the kiln cylinder 111. For example, as the industrial material is moved by a conveyance system from the kiln cylinder 111 into the collar, a first set of doors, in the collar 121, at the end of the kiln cylinder 111, can open to allow a conveyance mechanism to move industrial material to a staging position. The first set of doors can then close and a second set of doors can open to allow the conveyance mechanism to move industrial material from the staging position to the exterior environment.

As noted previously, the increased temperature in the kiln cylinder 111 can cause expansion in the radial direction. The expansion constraint assembly 151 can inhibit or prevent the kiln cylinder 111 from expanding asymmetrically. Various elements that may be included in the expansion constraint assembly 151 are described further with respect to FIG. 4.

Figure 4:
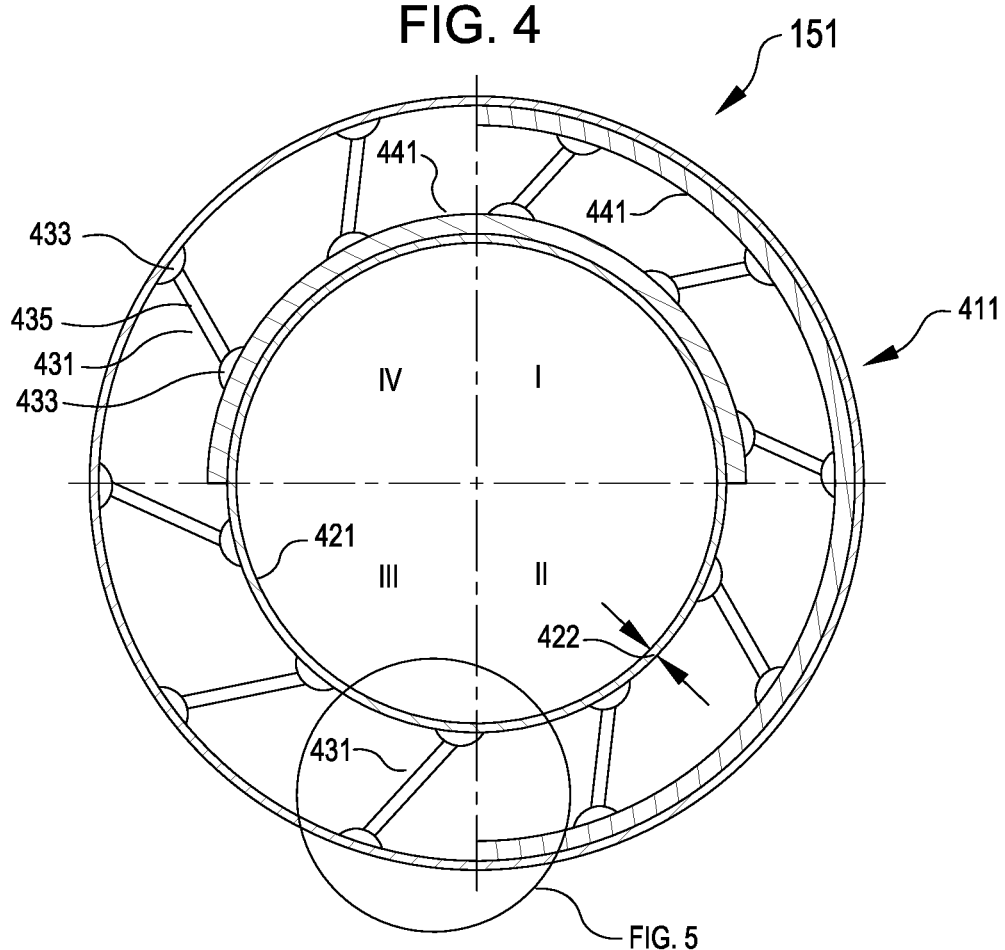
FIG. 4 is a cross-sectional front view showing components that may be included in an expansion constraint assembly that may be incorporated into the rotary kiln system of FIG. 1 according to various embodiments.

FIG. 4 depicts a cross-sectional front view of an example of an expansion constraint assembly 151 that may be used to inhibit or prevent asymmetrical expansion. The expansion constraint assembly 151 described may contain additional or alternative elements from the expansion constraint assembly 151 shown in FIG. 1.

The expansion constraint assembly 151 is depicted by way of example in FIG. 4 as including an outer constraining structure 411, an inner circular structure 421, and at least one support structure assembly 431. An example of an expansion constraint assembly 151 with the outer constraining structure 411 directly connected with the inner circular structure 421 by the support structure assemblies 431 is shown in quadrant III of FIG. 4. In some examples, the inner circular structure 421 may be the kiln cylinder 111, e.g., such that the outer constraining structure 411 may correspond to a ring, tube, or other suitable structure disposed about the exterior of the kiln cylinder 111. Alternatively, the outer constraining structure 411 may be the kiln cylinder 111, e.g., such that the inner circular structure 421 may correspond to a tube, ring, or other element located inside of the kiln cylinder 111. In a non-limiting example, the inner circular structure 421 can be 1-5 meters in diameter and made out of metal, although other sizes and/or materials may be utilized additionally or alternatively.

The expansion constraint assembly 151 may include one or more support structure assemblies 431, some or all of which may be attached to the exterior of the inner circular structure 421. The one or more support structure assemblies 431 may include, correspond to, or be replaced by braces or ligaments. FIG. 4 shows ten support structure assemblies 431 by way of example, but the expansion constraint assembly 151 may include any number of support structure assemblies 431. The one or more support structure assemblies 431 may be located inside the kiln cylinder 111, outside the kiln cylinder 111, or a combination of both inside and outside the kiln cylinder 111.

Each of the one or more support structure assemblies 431 can extend outwards from the inner circular structure 421 at an offset angle 451 away from a radial direction. The one or more support structure assemblies 431 may be made of metal or other material that is resistant to tension and/or compression. In a non-limiting example, the support structure assemblies 431 may be made out of steel, may have a cross-section of 1 to 10 square centimeters, and may span between an inner circular structure 421 of 1 to 3 meters and an outer constraining structure 411 of 1.1-3.1 meters. However, the material and size of the one or more support structure assemblies 431 may vary depending on the operational parameters of the expansion constraint assembly 151 and associated components with which it is implemented.

The one or more support structure assemblies 431 can include the additional elements of a base 433 and a ligament 435. The base 433 may include, correspond to, or be replaced by a foot, and may correspond to any suitable interface for facilitating bonding. For example, the base 433 may be made of material suitable for welding, such as steel that may then be welded to the exterior of the inner circular structure 421 or the interior of the outer constraining structure 411. Additionally or alternatively, the base 433 may correspond to a base with suitable surface area to facilitate bolting or have adequate coverage by an adhesive to enable bonding.

The base 433 and the ligament 435 may be connected using attachable and detachable structures. For example, internal threading or external threads may be incorporated in the base 433 and correspond to external threads or internal threading of the ligament 435. Having a threaded connection may allow the ligament to be pre-torqued, offering an additional degree of freedom during the heating and expansion of the inner circular structure 421. The base 433 and the ligament 435 may also be connected using a clevis attachment (e.g., incorporated into either the base 433 or the ligament 435) and a pin. Using a pin and clevis attachment may offer an additional degree of freedom during expansion and contraction of the inner circular structure 421, overcoming fatigue that may occur at the joint between the base 433 and the ligament 435.

The ligament 435 may be monolithic with or attach to the base 433 in order to connect the outer constraining structure 411 to the inner circular structure 421. Additionally, the ligament 435 may span between two respective bases 433, as pictured in FIG. 4. Alternatively, the ligament 435 may connect to the outer constraining structure 411 and the inner circular structure 421 without using any bases 433. For example, although in some cases components of the expansion constraint assembly 151 may be discrete parts that are subsequently joined together to form the assembly, the assembly in whole or in part may alternatively be formed as a monolithic structure such as by casting, flame cutting or another suitable technique.

Figure 7:
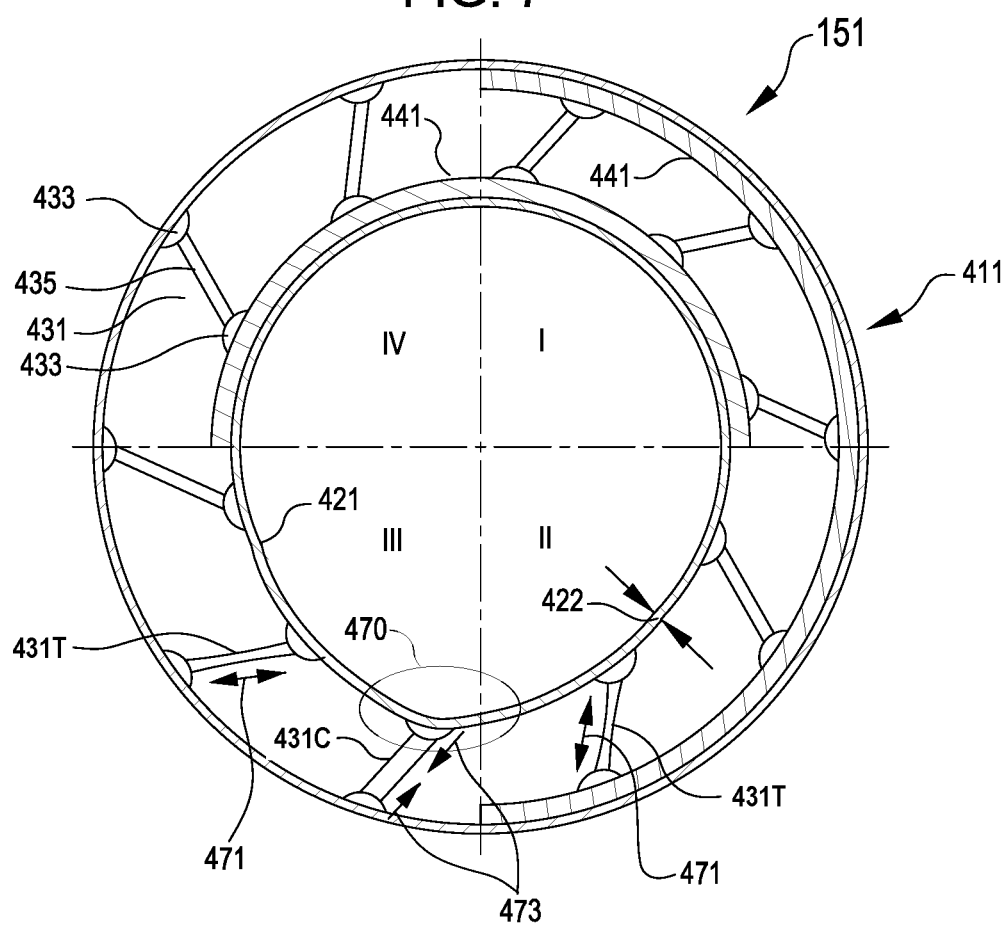
FIG. 7 is a cross-sectional front view showing components that may be included in an expansion constraint assembly that may be incorporated into the rotary kiln system of FIG. 1 according to various embodiments.

In operation, the outer constraining structure 411 may rotate in reaction to generally symmetric force distribution from the inner circular structure 421. Asymmetric expansion of the inner circular structure 421 may cause the one or more support structure assemblies 431 to react by transferring forces from the inner circular structure 421 to the outer constraining structure 411 to counteract this asymmetric expansion. For example, FIG. 4 shows an example of uniform expansion forces from the inner circular structure 421 acting on the ten support structure assemblies 431, causing the outer constraining structure 411 to rotate in a clockwise direction. FIG. 7 depicts an example condition of asymmetric heating and expansion, the displacement of the inner circular structure 421, the support structure 431T in tension (depicted by arrows 471), and the support structure 431C in compression (depicted by arrows 473) being exaggerated for clarity.

The expansion constraint assembly 151 may additionally include a ring 441. The ring 441 may be attached to the inner circular structure 421 or may alternatively be attached to the outer constraining structure 411. As examples, quadrant II of FIG. 4 shows the ring 441 attached to the outer constraining structure 411, and quadrant IV of FIG. 4 shows the ring 441 attached to the inner circular structure 421. The expansion constraint assembly 151 may alternatively contain multiple rings 441. For example, as shown in quadrant I of FIG. 4, a first ring 441 can be attached to the inner circular structure 421 and a second ring 441 can be attached to the outer constraining structure 411. In various examples, the support structure assemblies 431 may be attached to the inner circular structure 421 and/or the outer constraining structure 411 by one or more of the inner rings 441. In some examples, utilizing one or more inner rings 441 may provide additional expansion-resisting constraints and/or provide suitable transition structures for coupling dissimilar materials. Additionally or alternatively, in some examples, at least one of the inner rings 441 may correspond to a ring that is already in place and that may be retrofit to be incorporated into the expansion constraint assembly 151.

Figure 5:
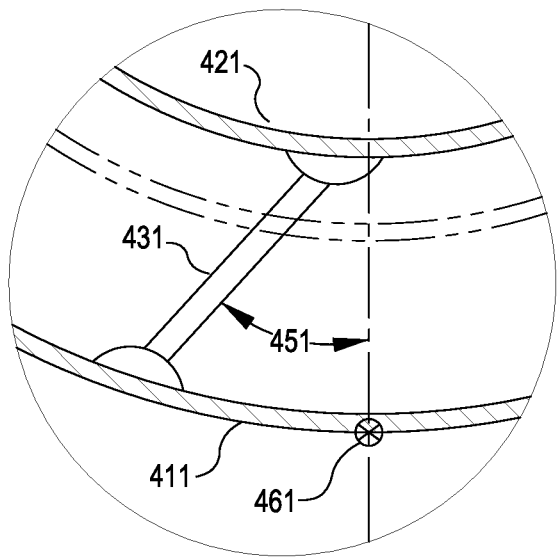
FIG. 5 is a cross-sectional front view of a portion of the expansion constraint assembly of FIG. 4 before expansion of an associated circular structure has occurred according to various embodiments.
Figure 6:
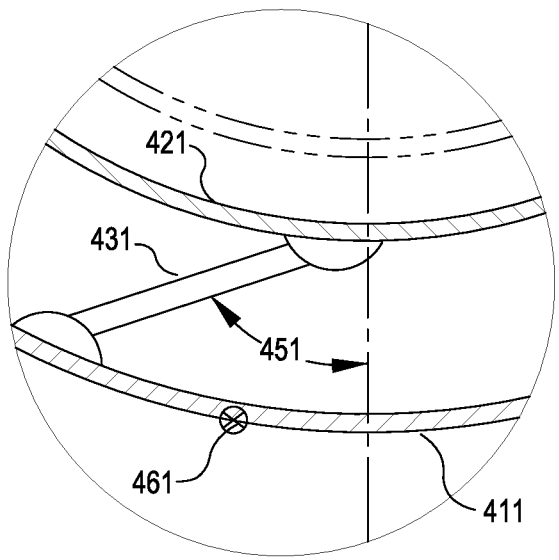
FIG. 6 is a cross-sectional front view of a portion of the expansion constraint assembly of FIG. 4 after expansion of the associated circular structure has occurred according to various embodiments.

FIGS. 5 and 6 depict a portion of the cross-sectional front view of the expansion constraint assembly 151 of FIG. 4, respectively showing the inner circular structure 421, before and after expansion. FIG. 5 shows: the inner circular structure 421 (before expansion in solid lines and after expansion in phantom lines); the offset angle 451 of the support structure assembly 431; and a reference point 461 on the outer constraining structure 411.

FIG. 6 shows: the inner circular structure 421 (before expansion in phantom lines and after expansion in solid lines); the offset angle 451; and the reference point 461. Before the inner circular structure 421 expands (e.g., FIG. 5), the support structure assembly 431 can be at a first offset angle 451 and the reference point 461 can be at a first location. The inner circular structure 421 may expand, for example, moving from the position shown in solid lines in FIG. 5 to the position shown in solid lines in FIG. 6. Expansion of the inner circular structure 421 can cause the outer constraining structure 411 to rotate, for example, increasing the offset angle 451 from that shown in FIG. 5 to that shown in FIG. 6 and/or rotating the reference point 461 to a second location shown in FIG. 6 from the first location shown in FIG. 5.

As depicted by FIG. 7, if the thermal profile of the inner circular structure 421 is radially asymmetric 470, the respective support structure assemblies 431 may be forced into tension (depicted by arrows 471) or compression (depicted by arrows 473) to resist the local expansion displacement force that is driven by the asymmetric thermal profile. The expansion displacement force may be relieved by redirecting the force through the support structure assemblies 431 and along the arc of the outer constraining structure 411. The outer constraining structure 411 may rotate relative to the inner circular structure 421 to relieve the redirected expansion displacement force. Redirecting the force caused by the expansion displacement may prevent high stress and yield or fracture of the inner circular structure 421.

The differential expansion of the inner circular structure 421 is shown by way of example in FIG. 5 and FIG. 6, but the extent and/or direction of variation of the inner circular structure 421 could vary. For example, the inner circular structure 421 may expand until it is almost touching the outer constraining structure 411 or expand at the same rate so that the outer constraining structure 411 does not rotate. Moreover, although FIGS. 5, 6, and 7 have been described in terms of constraining or distributing expansion, in some examples, associated elements may instead constrain or distribute contraction, such as in the case of contraction of the inner circular structure 421 being constrained by the outer constraining structure 411 rotating at least in part counter clockwise and/or by reduction of the angle 451 of the support structure assembly 431.

An example of operation of the outer constraining structure 411 is shown in FIG. 5 and FIG. 6 by the relative movement of the reference point 461 and the increase in the offset angle 451. The reference point 461 may move between 0.1 mm and 10 mm, but movement may be smaller or larger depending on the operation of the expansion constraint assembly 151. The offset angle 451 can, for example, start at 40 degrees and increase to an angle of 45 degrees. However, other ranges and/or amounts of change of the offset angle 451 may be suitable.

In some aspects, a device, a system, or a method is provided according to one or more of the following examples or according to some combination of the elements thereof. In some aspects, features of a device or a system described in one or more of these examples can be utilized within a method described in one of the other examples, or vice versa.

Illustrations

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1 is a rotary kiln system (which may include features of any of the subsequent illustrations), comprising: a rotator; a heating system; a kiln cylinder rotatable by the rotator, the kiln cylinder in communication with the heating system to provide heat into the kiln cylinder, the kiln cylinder comprising: a central axis; an exterior kiln cylinder surface; a cross-sectional thickness urged toward variable expansion in a radial direction of the kiln cylinder and responsive to a variable thermal profile resulting from heat provided within the kiln cylinder by thermal actions or reactions of the material being processed or the heating system; a collar axially aligned with the central axis and receiving at least one portion of the kiln cylinder; and an expansion constraint assembly axially aligned with the central axis and disposed radially outward from the kiln cylinder, the expansion constraint assembly configured to limit the variable expansion of the cross-sectional thickness of the kiln cylinder, the expansion constraint assembly comprising: an outer constraining structure; and a plurality of support structures, each extending between an interior of the outer constraining structure and the exterior kiln cylinder surface, each arranged at an offset angle away from the radial direction of the outer constraining structure, and each anchored to the exterior kiln cylinder surface and the outer constraining structure.

Illustration 2 is the rotary kiln system of illustration(s) 1 (or of any other preceding or subsequent illustration individually or in combination), wherein the collar further comprises: a plurality of leaves attached to the collar and engaged with the exterior kiln cylinder surface.

Illustration 3 is the rotary kiln system of illustration(s) 1 (or of any other preceding or subsequent illustration individually or in combination), wherein the kiln cylinder further comprises a first portion at a first end, a second portion at a second end, and a middle portion between the first portion and the second portion.

Illustration 4 is the rotary kiln system of illustration(s) 3 (or of any other preceding or subsequent illustration individually or in combination), wherein the collar is a first collar in engagement with the first portion of the kiln cylinder; and the rotational kiln system further comprises a second collar in engagement with a different portion of the kiln cylinder.

Illustration 5 is the rotary kiln system of illustration(s) 1 (or of any other preceding or subsequent illustration individually or in combination), wherein the central axis is at an angle so that a first end of the kiln cylinder is positioned vertically higher than a second end of the kiln cylinder.

Illustration 6 is the rotary kiln system of illustration(s) 1 (or of any other preceding or subsequent illustration individually or in combination), wherein the expansion constraint assembly further comprises a ring axially aligned with the kiln cylinder and anchored to the exterior kiln cylinder surface, wherein the plurality of support structures are engaged with the outer constraining structure and inner ring.

Illustration 7 is the rotary kiln system of illustration(s) 1 (or of any other preceding or subsequent illustration individually or in combination), wherein: the expansion constraint assembly is a first expansion constraint assembly; and the kiln cylinder further comprises a second expansion constraint assembly extending around the kiln cylinder.

Illustration 8 is the rotary kiln system of illustration(s) 1 (or of any other preceding or subsequent illustration individually or in combination), wherein the variable expansion of the kiln cylinder causes the offset angle of at least one of the plurality of support structures to increase.

Illustration 9 is the rotary kiln system of illustration(s) 8 (or of any other preceding or subsequent illustration individually or in combination), wherein the increase of the offset angle of at least one of the plurality of support structures causes the outer constraining structure to rotate about the central axis of the kiln cylinder.

Illustration 10 is an expansion constraining assembly for industrial processing equipment for processing metal or other material (which may include features of any of the preceding or subsequent illustrations), the assembly comprising: an outer constraining structure; an inner circular structure disposed radially inward from the outer constraining structure and within the expansion constraining assembly; and a plurality of support structures arranged at an offset angle away from a radial direction of the outer constraining structure, extending between the outer constraining structure and the inner circular structure, and attached to the outer constraining structure and the inner circular structure.

Illustration 11 is the assembly of illustration(s) 10 (or of any other preceding or subsequent illustration individually or in combination), further comprising at least one ring within the outer constraining structure and disposed between the outer constraining structure and the inner circular structure, wherein the plurality of support structures are attached via the at least one ring.

Illustration 12 is the assembly of illustration(s) 11 (or of any other preceding or subsequent illustration individually or in combination), wherein the at least one ring comprises a first ring and a second ring, wherein the first ring is attached to the inner circular structure and the second ring is attached to the outer constraining structure, and wherein the plurality of support structures are attached via the first ring and the second ring.

Illustration 13 is the assembly of illustration(s) 10 (or of any other preceding or subsequent illustration individually or in combination), wherein the offset angle of at least one of the plurality of support structures is between 1 degrees and 89 degrees.

Illustration 14 is the assembly of illustration(s) 10 (or of any other preceding or subsequent illustration individually or in combination), wherein a cross section of at least one of plurality of support structures is at least 1 square-centimeter.

Illustration 15 is the assembly of illustration(s) 10 (or of any other preceding or subsequent illustration individually or in combination), wherein at least one of the plurality of support structures comprises: a base configured to attach to the inner circular structure; and a ligament attached to the base.

Illustration 16 is an expansion constraining method for industrial processing equipment for processing metal or other material (which may include features of any of the preceding or subsequent illustrations), the method comprising: receiving an outer constraining structure and a plurality of support structures on an outer surface of an inner circular structure of the industrial processing equipment; and resisting non-uniform expansion of the inner circular structure by at least causing an increase in a tension or compression of at least one of the plurality of support structures or causing rotation of the outer constraining structure around a central axis of the inner circular structure.

Illustration 17 is the method of illustration(s) 16 (or of any other preceding or subsequent illustration individually or in combination), further comprising causing a change in an offset angle away from a radial direction of the outer constraining structure of at least one of the plurality of support structures due to resisting the non-uniform expansion of the inner circular structure.

Illustration 18 is the method of illustration(s) 17 (or of any other preceding or subsequent illustration individually or in combination), wherein causing the change in the offset angle of the at least one of the plurality of support structures further causes the outer constraining structure to rotate.

Illustration 19 is the method of illustration(s) 16 (or of any other preceding or subsequent illustration individually or in combination), wherein at least one of the plurality of support structures experiences an increase in tension and at least one other of the plurality of support structures experiences an increase in compression.

Illustration 20 is the method of illustration(s) 16 (or of any other preceding or subsequent illustration individually or in combination), wherein the non-uniform expansion is caused by a temperature increase or decrease inside the inner circular structure.

All patents, publications and abstracts cited above are incorporated herein by reference in their entirety. The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A rotary kiln system, comprising:
  a rotator;
  a heating system;
  a kiln cylinder rotatable by the rotator, the kiln cylinder in communication with the heating system to provide heat into the kiln cylinder, the kiln cylinder comprising:
    a central axis;
    an exterior kiln surface;
    a cross-sectional thickness urged toward variable expansion in a radial direction of the kiln cylinder and responsive to a variable thermal profile resulting from heat provided within the kiln cylinder by thermal actions or reactions of material being processed or from the heating system;
    a collar axially aligned with the central axis and receiving at least one portion of the kiln cylinder; and an expansion constraint assembly axially aligned with the central axis and disposed radially outward from the kiln cylinder, the expansion constraint assembly configured to limit the variable expansion of the cross-sectional thickness of the kiln cylinder, the expansion constraint assembly comprising:

an outer constraining structure;

a first ring and a second ring within the outer constraining structure and disposed between the outer constraining structure and the exterior kiln surface, wherein the first ring is directly attached to the exterior kiln surface and isothermal with the exterior kiln surface, and wherein the second ring is directly attached to the outer constraining structure, the first ring comprising an outer surface and the second ring comprising an inner surface facing the outer surface of the first ring and spaced apart from the outer surface of the first ring;

a plurality of first bases on the outer surface of the first ring, each first base of the plurality of first bases comprising an arcuate surface;

a plurality of second bases on the inner surface of the second ring, each second base of the plurality of second bases comprising an arcuate surface; and a plurality of support structures, each support structure of the plurality of support structures extending between one first base of the plurality of first bases and a corresponding second base of the plurality of second bases, each support structure of the plurality of support structures arranged at an offset angle away from the radial direction of the outer constraining structure, and each support structure of the plurality of support structures anchored to the exterior kiln surface and the outer constraining structure via the corresponding first base and second base, wherein the plurality of support structures are attached to the outer constraining structure and the exterior kiln surface via the first ring and the second ring.

2. The rotary kiln system of claim 1, wherein the collar further comprises a plurality of leaves attached to the collar and engaged with the exterior kiln surface.

3. The rotary kiln system of claim 1, wherein the kiln cylinder further comprises a first portion at a first end, a second portion at a second end, and a middle portion between the first portion and the second portion.

4. The rotary kiln system of claim 3, wherein the collar is a first collar in engagement with the first portion of the kiln cylinder; and the rotary kiln system further comprises a second collar in engagement with a different portion of the kiln cylinder.

5. The rotary kiln system of claim 1, wherein the central axis is at an angle so that a first end of the kiln cylinder is positioned vertically higher than a second end of the kiln cylinder.

6. The rotary kiln system of claim 1, wherein the first ring is axially aligned with the kiln cylinder.

7. The rotary kiln system of claim 1, wherein:
the expansion constraint assembly is a first expansion constraint assembly; and
the kiln cylinder further comprises a second expansion constraint assembly extending around the kiln cylinder.

8. The rotary kiln system of claim 1, wherein the variable expansion of the kiln cylinder causes the offset angle of at least one of the plurality of support structures to increase.

9. The rotary kiln system of claim 8, wherein the increase of the offset angle of at least one of the plurality of support structures causes the outer constraining structure to rotate about the central axis of the kiln cylinder.

10. The rotary kiln system of claim 1, wherein the plurality of first bases are circumferentially offset from the plurality of second bases.

11. An expansion constraining assembly for industrial processing equipment for processing metal or other material, the assembly comprising:

an outer constraining structure;

an inner circular structure disposed radially inward from the outer constraining structure and within the expansion constraining assembly;

a plurality of support structures arranged at an offset angle away from a radial direction of the outer constraining structure, extending between the outer constraining structure and the inner circular structure, and attached to at least one of the outer constraining structure or the inner circular structure;

a first ring and a second ring within the outer constraining structure and disposed between the outer constraining structure and the inner circular structure, wherein the first ring is directly attached to the inner circular structure and isothermal with the inner circular structure, and wherein the second ring is directly attached to the outer constraining structure, the first ring comprising an outer surface and the second ring comprising an inner surface facing the outer surface of the first ring and spaced apart from the outer surface of the first ring;

a plurality of first bases on the outer surface of the first ring, each first base of the plurality of first bases comprising an arcuate surface; and a plurality of second bases on the inner surface of the second ring, each second base of the plurality of second bases comprising an arcuate surface, wherein each support structure of the plurality of support structures extends between one first base of the plurality of first bases and a corresponding second base of the plurality of second bases, and wherein the plurality of support structures are attached to the outer constraining structure and the inner circular structure via the plurality of first bases on the first ring and the plurality of second bases on the second ring.

12. The assembly of claim 11, wherein the offset angle of at least one of the plurality of support structures is between 1 degrees and 89 degrees.

13. The assembly of claim 11, wherein a cross section of at least one of plurality of support structures is at least 1 square-centimeter.

14. An expansion constraining method for industrial processing equipment for processing metal or other material, the method comprising:

receiving an outer constraining structure and a plurality of support structures on an outer surface of an inner circular structure of the industrial processing equipment;

resisting non-uniform expansion of the inner circular structure by at least causing an increase in a tension or compression of at least one of the plurality of support structures or causing rotation of the outer constraining structure around a central axis of the inner circular structure;

causing a change in an offset angle away from a radial direction of the outer constraining structure of at least one of the plurality of support structures due to resisting the non-uniform expansion of the inner circular structure;

providing a first ring and a second ring within the outer constraining structure and disposing the first ring and the second ring between the outer constraining structure and the inner circular structure, wherein the first ring is directly attached to the inner circular structure and isothermal with the inner circular structure, and wherein the second ring is directly attached to the outer constraining structure, the first ring comprising an outer surface and the second ring comprising an inner surface facing the outer surface of the first ring and spaced apart from the outer surface of the first ring, wherein a plurality of first bases are on the outer surface of the first ring, each first base of the plurality of first bases comprising an arcuate surface, and wherein a plurality of second bases are on the inner surface of the second ring, each second base of the plurality of second bases comprising an arcuate surface; and attaching the plurality of support structures to the outer constraining structure and the inner circular structure surface via the first ring and the second ring by extending each support structure of the plurality of support structures between one first base of the plurality of first bases and a corresponding second base of the plurality of second bases.

15. The method of claim 14, wherein causing the change in the offset angle of the at least one of the plurality of support structures further causes the outer constraining structure to rotate.

16. The method of claim 14, wherein at least one of the plurality of support structures experiences an increase in tension and at least one other of the plurality of support structures experiences an increase in compression.

17. The method of claim 14, wherein the non-uniform expansion is caused by a temperature increase or decrease inside the inner circular structure.

* * * * *